(12) United States Patent
Hamada et al.

(10) Patent No.: US 7,189,474 B2
(45) Date of Patent: Mar. 13, 2007

(54) BATTERY PACK

(75) Inventors: Shinji Hamada, Toyohashi (JP); Toyohiko Eto, Toyota (JP)

(73) Assignees: Matsushita Electric Industrial Co., Ltd., Kadoma (JP); Toyota Jidosha Kabushiki Kaisha, Toyota (JP)

( * ) Notice: Subject to any disclaimer, the term of this patent is extended or adjusted under 35 U.S.C. 154(b) by 354 days.

(21) Appl. No.: 10/667,758

(22) Filed: Sep. 22, 2003

(65) Prior Publication Data

US 2004/0058233 A1   Mar. 25, 2004

(30) Foreign Application Priority Data

Sep. 20, 2002   (JP) ............... 2002-274801

(51) Int. Cl.
*H01M 10/50* (2006.01)
*H01M 2/02* (2006.01)

(52) U.S. Cl. ............... 429/120; 429/62; 429/151

(58) Field of Classification Search ............... 429/62, 429/120, 151
See application file for complete search history.

(56) References Cited

U.S. PATENT DOCUMENTS 5,140,744 A * 8/1992 Miller ................ 29/730
6,211,646 B1 * 4/2001 Kouzu et al. ............... 320/107
6,335,116 B1 * 1/2002 Yamane et al. ............. 429/176
6,433,509 B2 * 8/2002 Kobayashi et al. ......... 320/107
6,555,264 B1 * 4/2003 Hamada et al. ............. 429/156

FOREIGN PATENT DOCUMENTS

JP   2001-167803   6/2001

OTHER PUBLICATIONS

Linden, D.R., "Handbook of Batteries", 2nd, McGraw-Hill, Inc. 1995, pp. 5.11-5.12.*

* cited by examiner

*Primary Examiner*—Mark Ruthkosky
(74) *Attorney, Agent, or Firm*—Jordan and Hamburg LLP

(57) ABSTRACT

A battery pack is compos d of a plurality of battery modules, holding brackets, a tubular cover, and a fan. The battery module is composed of a plurality of sealed rechargeable batteries having a metal case, which are arranged in a row and integrally connected in series. The plurality of battery modules are arranged in parallel, and the holding brackets hold both ends of the battery modules in a direction perpendicular to a parallel direction. The tubular cover forms a coolant path by surrounding the periphery of the battery modules. The fan supplies coolant to the inside of the coolant path. In the battery pack with above structure, increase in the height thereof is prevented.

3 Claims, 6 Drawing Sheets

BATTERY PACK

The present disclosure relates to subject matter contained in priority Japanese Patent Application No. 2002-274801, filed on Sep. 20, 2002, the contents of which is herein expressly incorporated by reference in its entirety.

BACKGROUND OF THE INVENTION

1. Field of the Invention

The present invention relates to a battery pack comprising a plurality of battery modules arranged in parallel, each of which has a plurality of cells integrally connected in series, each battery module being cooled in compact structure.

2. Description of the Related Art

Conventionally is known a battery pack with high capacity which comprises a plurality of prismatic cells or battery modules arranged in parallel. Each of the battery modules has a plurality of cells integrally connected in series. A binding rod or a binding band ties the arranged cells or battery modules with end plates disposed at both ends thereof in a parallel direction. In this construction, the cells or battery modules are connected in series.

Japanese Patent Laid-Open Publication No. 2001-167803, for example, discloses a battery pack in which cooling air blows from beneath in an upward direction into between the cells or battery modules of the battery pack. The cooling air prevents increase in cell temperature due to heat generated by charge and discharge, so that it is possible to prevent decrease in battery output, a charge and discharge rate, and battery lifetime.

One example of this type of battery pack will be hereinafter described with reference to FIGS. 7 and 8. In FIG. 7, a battery pack 41 is used as a drive source for an electric vehicle including a hybrid electric vehicle. The battery pack 41 comprises 10 to 30 battery modules 42 arranged in parallel with ventilating spaces 44 in a vertical direction provided between the battery modules 42. A pair of binding bands 46 and a pair of end plates 45 disposed at both ends of the battery modules 42 in a parallel direction hold the battery modules 42 to fix them in an integral manner.

Each battery module 42, as shown in FIG. 8, comprises a plurality of cells 43 integrally arranged in series. Each cell 43 is composed of an electrode plate assembly and an electrolyte solution contained in a case. The plurality of cells 43 are connected in series inside the battery module 42. In the battery pack 41, connection terminals 47 of the battery modules 42, protruding from both end walls thereof, are successively connected in series to obtain a predetermined output voltage of the battery pack 41. Vertical ribs 49 are provided on both sidewalls 48 of the battery module 42 between each of the cells 43 and the ends of the battery module 42, When the battery modules 42 are arranged in parallel in such a manner that the sidewalls 48 of the battery modules 42 are opposed to each other, the vertical ribs 49 make contact with each other to form the ventilating space 44 between the sidewalls 48.

The battery pack 41 is disposed on a bottom chamber 51 which has an air intake space 50 connected with each ventilating space 44. Both ends of each battery module 42 are secured to the bottom chamber 51 with bolts 59 from beneath. A top chamber 53 with an air discharge space 52 is disposed on the battery pack 41. An intake duct 56 connected to an intake fan 55 is fitted into an intake opening 54 provided in an end wall of the bottom chamber 51, and a discharge duct 58 is fitted into a discharge opening 57 provided in an end wall of the top chamber 53.

However, in the battery pack 41 with the above-mentioned structure, the large number of assembly processes and parts are necessary because each battery module 42 is secured to the bottom chamber 51 with the bolts 59, so that cost increases. It is necessary to dispose the end plates 45 at both ends of the arranged battery modules 42, so that the battery pack 41 necessitates a large space for installation and high cost.

To cool each of the battery modules 42, the intake fan 55 supplies the air intake space 50 with air in a vehicle compartment. The air flows through the ventilating spaces 44 between the battery modules 42 from beneath in the upward direction, and is discharged into the air discharge space 52 disposed above the battery pack 41. Accordingly, it is necessary to provide a space for the air intake space 50 and the air discharge space 52. Thus, since the size of the battery pack 41 becomes large in the vertical direction, a place for installation is restricted in a case where the battery pack 41 is used as the drive source for a vehicle.

SUMMARY OF THE INVENTION

In light of the above-mentioned problems, an object of the present invention is to provide a battery pack which efficiently cools individual battery modules while reducing the number of assembly processes and cost, and reducing the size of the battery pack in a vertical direction.

A battery pack according to the present invention includes a plurality of battery modules arranged in parallel, and holding brackets for holding both ends of the battery modules in a direction perpendicular to the parallel direction of the battery modules. Each battery module includes a plurality of sealed rechargeable batteries having a metal case, arranged in a row and integrally connected in series. The metal case prevents expansion in the sidewalls of the sealed rechargeable battery constituting the battery module. Accordingly, simply arranging the battery modules in parallel, and holding both ends thereof in the direction perpendicular to the parallel direction make it possible to compose the battery pack. It is unnecessary to secure the battery modules in the arrangement direction thereof, so that an end plate is eliminated and the number of assembly processes, cost for parts, and installation space are reduced.

In the above battery pack, the battery modules are preferably disposed with a cooling space provided between them. Also, a tubular cover for surrounding the battery modules, and a coolant supply device for supplying coolant to the inside of the tubular cover are preferably provided.

To hold the battery modules, the end of each battery module is fitted into a ring-shaped protrusive wall provided in the holding bracket, and the ring-shaped walls slide in both ends of the tubular cover. A slit is formed in the holding bracket in such a position as to correspond to the cooling space between the battery modules. A fan is preferably provided in the outer surface of at least one of the holding brackets.

A member for restricting or promoting cooling may be disposed in the sidewall of the sealed rechargeable battery facing the cooling space between the battery modules, to even cooling performance between an intake side and an discharge side of the coolant.

The fan may be structured such that the blow direction thereof is changeable at a predetermined time interval, or in accordance with difference in detected temperature at both ends of the battery module.

While novel features of the invention are set forth in the preceding, the invention, both as to organization and con-

DETAILED DESCRIPTION OF THE PREFERRED EMBODIMENTS

A battery pack with a cooling device according to an embodiment of the present invention will be hereinafter described with reference to FIGS. 1 to 6.

Figure 1:
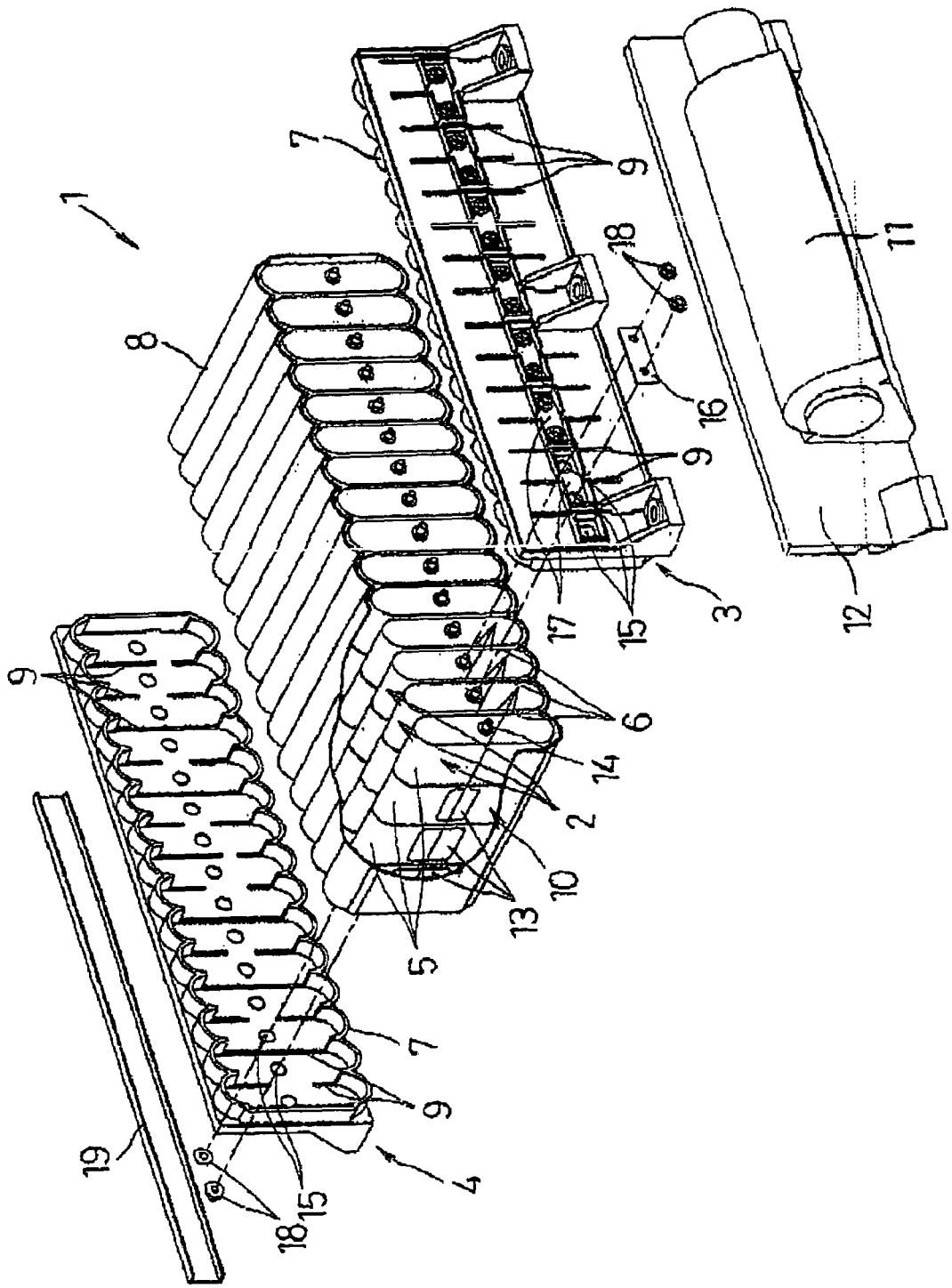
FIG. 1 is an exploded perspective view of a battery pack according to an embodiment of the present invention.

Referring to FIG. 1, a battery pack 1 as a drive source for an electric vehicle including a hybrid electric vehicle includes 10 to 30 (15 in this embodiment) battery modules 2 arranged in parallel. Holding brackets 3 and 4 hold both ends of the battery modules 2 in a vertical direction perpendicular to the parallel direction of the battery modules 2, and in a longitudinal direction of the battery module 2.

The battery module 2 is composed of a plurality (four in FIG. 1) of sealed rechargeable batteries 5 having a metal case which are arranged in a row and integrally connected in series. The battery modules 2 are arranged in parallel with cooling spaces 6 of approximately 1 to 5 mm provided between each of the battery modules 2. The holding brackets 3 and 4 hold the battery modules 2 with both end faces of each battery module 2 fitted into ring-shaped protrusive walls 7 provided in the holding brackets 3 and 4. The ring-shaped protrusive walls 7 are formed in the shape of a sectional outside shape of the battery modules 2 arranged in parallel.

The periphery of the battery modules 2, arranged in parallel, is surrounded by a tubular cover 8 having the almost same length as the battery module 2. The ring-shaped protrusive walls 7 slide in both ends of the tubular cover 8 to hold the tubular cover 8. Slits 9 are formed in the holding brackets 3 and 4 in such positions as to correspond with the cooling spaces 6 between the battery modules 2. In this manner, the tubular cover 8 and the holding brackets 3 and 4 form a coolant path 10 to efficiently supply the cooling spaces 6 with coolant.

A fan 11 composed of a tangential fan such as a sirocco fan is attached to the outer race or one of the holding brackets 3 with an attachment plate 12. The fan 11 with compact structure forms a coolant flow evenly distributing in a wide range. The coolant is supplied to the coolant path 10 in one direction from one end to the other end thereof, In this embodiment, cooling air is sucked from the slits 9 of the holding bracket 4, and is discharged to the outside from the slits 9 of the holding bracket 3 by the fan 11.

In each battery module 2, heat insulation sheets 13 are glued on the sidewall of the sealed rechargeable batteries 5, facing the cooling space 6. The size of the heat insulation sheet 13 sequentially becomes smaller in a direction from an intake side to a discharge side of the coolant, in order to achieve even cooling performance for the rechargeable batteries 5 between the intake side and the discharge side of the coolant.

In the holding brackets 3 and 4, terminal holes 15 are formed. Connection terminals 14 projecting in the middle of both end faces of the battery modules 2 penetrate through the terminal holes 15. In the outer faces of the holding brackets 3 and 4, are formed hold recesses 17 which hold bus bars 16 for connecting the connection terminals 14 of the battery modules 2 adjacent to each other. The adjacent connection terminals 14 of opposite polarities are connected to each other by securing the connection terminals 14 and the bus bar 16 with nuts 18. A bus bar cover 19 covers the attachment areas of the bus bars 16 of the holding bracket 4. The attachment areas of the bus bars 16 of the holding bracket 3 are covered with the attachment plate 12.

Now, the battery module 2 will be described in detail with reference to FIGS. 2 to 6.

Figure 2:
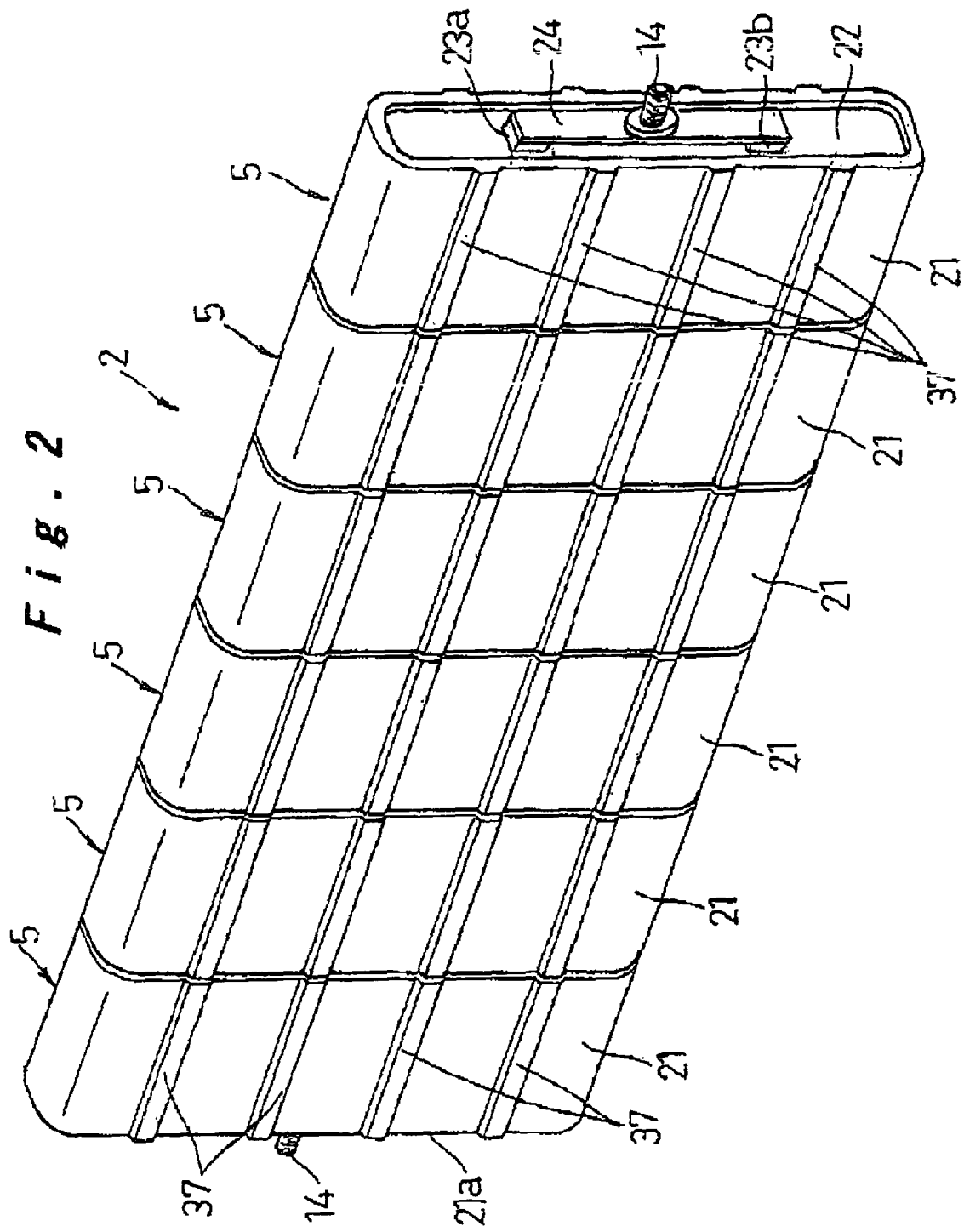
FIG. 2 is a perspective view of a battery module according to the embodiment.
Figure 3:
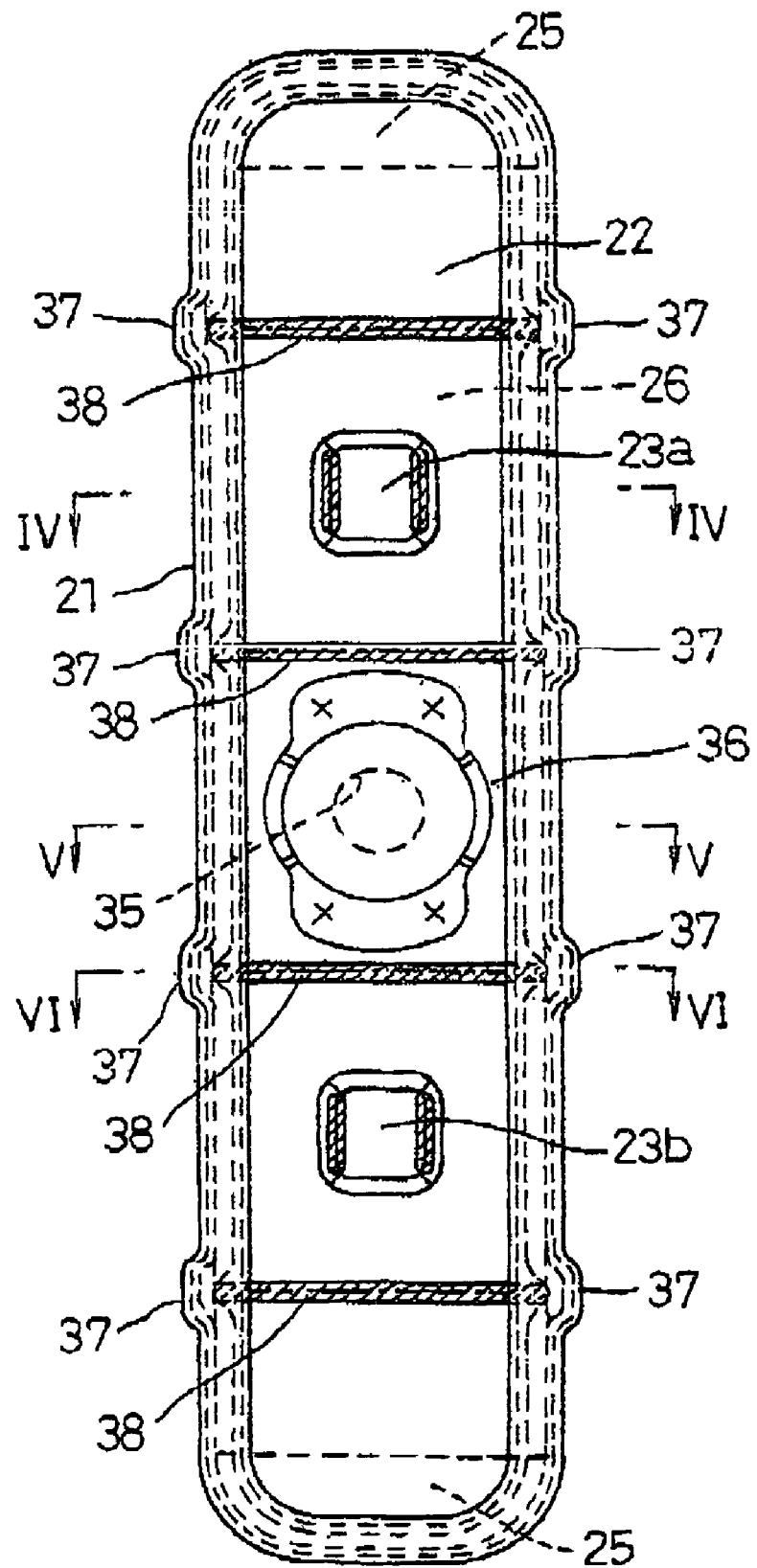
FIG. 3 is a side view of the battery module viewed from a sealing plate side.

In FIG. 2, the battery module 2 includes a plurality (six in FIG. 2) of sealed rechargeable batteries 5 which are arranged in a row and integrally connected in series. Each rechargeable battery 5 has a prismatic metal case 21 the cross section of which is rectangular with or without rounded-corners, and a metal sealing plate 22 for sealing one end opening of the metal case 21. In a case of a nickel-metal hydride (NiMH) battery, the case 21 and the sealing plate 22 are made of a nickel-plated steel plate for the purpose of securing resistance to an electrolyte solution.

A pair of connection projections 23a and 23b is formed on the sealing plate 22 of the rechargeable battery 5 disposed at one end of the battery module 2. A connection plate 24, at the middle of which the connection terminal 14 of one polarity is provided, is put on and welded to the connection projections 23a and 23b. The connection terminal 14 of the other polarity is welded to the middle of the bottom face 21a of the case 21 of the rechargeable battery 5 disposed at the other end of the battery module 2.

Each sealed rechargeable battery 5, as shown in FIGS. 3 to 6, is composed of an electrode plate assembly 26 contained in the case 21 with the electrolyte solution. In the cross section of the case 21, there are spaces 25 at both ends in a longitudinal direction. The space 25 functions as a supply path of the electrolyte solution for keeping the distribution of the electrolyte solution to the whole electrode plate assembly 26.

The electrode plate assembly 26 has a plurality of positive electrode plates 27 and negative electrode plates 28 stacked with separators 29 interposed therebetween. Core substrates 27a and 28a of the positive electrode plate 27 and the negative electrode plate 28 protrude in opposite directions to each other. A positive end face 30 and a negative end face 31 are formed at both ends of the electrode plate assembly 26, with the end faces of the core substrates 27a and 28a, respectively. The electrode plate assembly 26 may be formed in such a manner that a strip of positive electrode plate and a strip of negative electrode plate with a separator interposed therebetween are wound around a spool, and then the positive and negative electrode plates are compressed after pulling out the spool.

The positive end face 30 and the negative end face 31 of the electrode plate assembly 26 are directly connected to the sealing plate 22 and the bottom face 21a of the case 21, respectively, as described later, An insulating gasket 32 is disposed between the sealing plate 22 and the case 21. A connection collar 33 is formed on the outer periphery of the sealing plate 22 in an upright manner. The U-shaped gasket 32 in cross section is attached so as to cover the end face and the inner and outer side faces of the connection collar 33, and the sealing plate 22 is inserted into the opening of the case 21. Then, the opening of the case 21 is bent inwardly to cover the connection collar 33, so that the case 21 is sealed.

In the bottom face 21a of the case 21, a pair of rectangular connection projections 34a and 34b is formed at an interval so as to correspond to the connection projections 23a and 23b provided in the sealing plate 22. A pouring opening 35 for pouring the electrolyte solution is formed in the middle of the sealing plate 22. After pouring, a safety vent 36 with a rubber valve 36a is fitted over the pouring opening 35 to tightly enclose the pouring opening 35.

A plurality (four in the drawing) of protrusions 37 in the shape of a trapezoid in cross-section are continuously formed across the bottom face 21a and the opening at predetermined intervals in such a manner as to be opposed to ach other in both sidewalls of the case 21. The positive end face 30 of the electrode plate assembly 26 and the sealing plate 22, and the bottom face 21a of the case 21 and the negative end face 31 are welded respectively in a welding portion 38 by laser beam welding, electron beam welding or the like across the protrusions 37 on both sidewalls. In the connection collar 33 of the sealing plate 22, a protrusion extending outward and corresponding to the protrusion 37 is formed in order to securely form the welding portion 38 across the whole width between the positive end face 30 and the negative end face 31. Accordingly, all the positive electrode plates 27 and the negative electrode plates 28 are securely connected to the sealing plate 22 and the bottom face 21a of the case 21, respectively.

The protrusions 37 are formed so as to have such a cross section and a pitch that both sidewalls of the case 21 do not create distortion over a predetermined amount under predetermined internal pressure.

Figure 4:
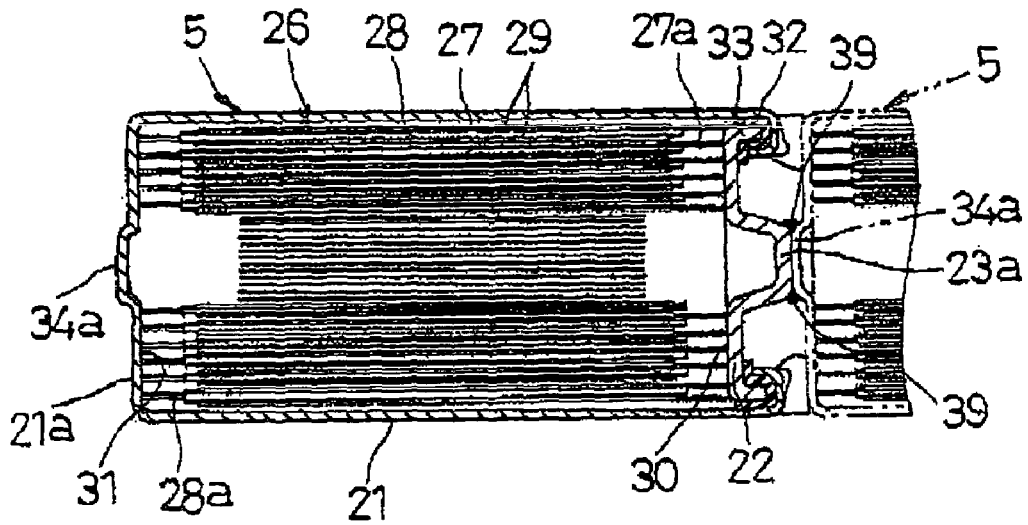
FIG. 4 is a sectional view taken along the line IV—IV of FIG. 3.
Figure 5:
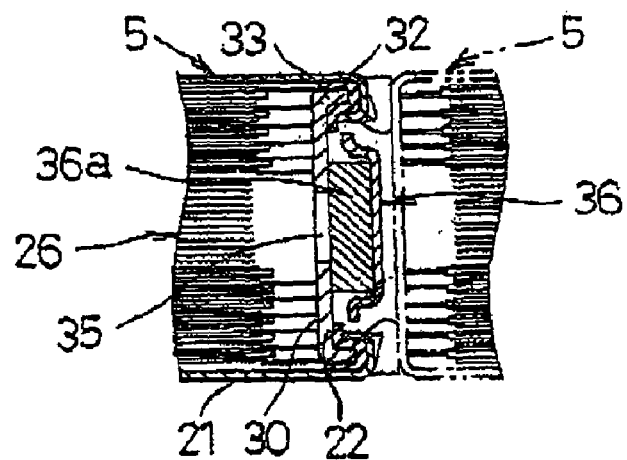
FIG. 5 is a sectional view taken along the line V—V of FIG. 3.
Figure 6:
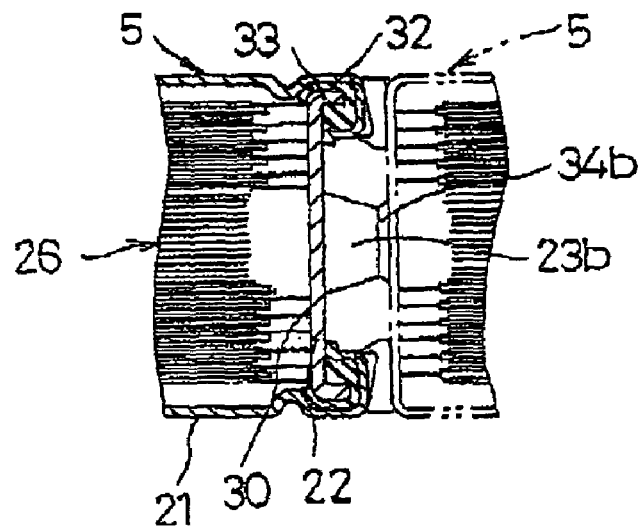
FIG. 6 is a sectional view taken along the line VI—VI of FIG. 3.
Figure 7:
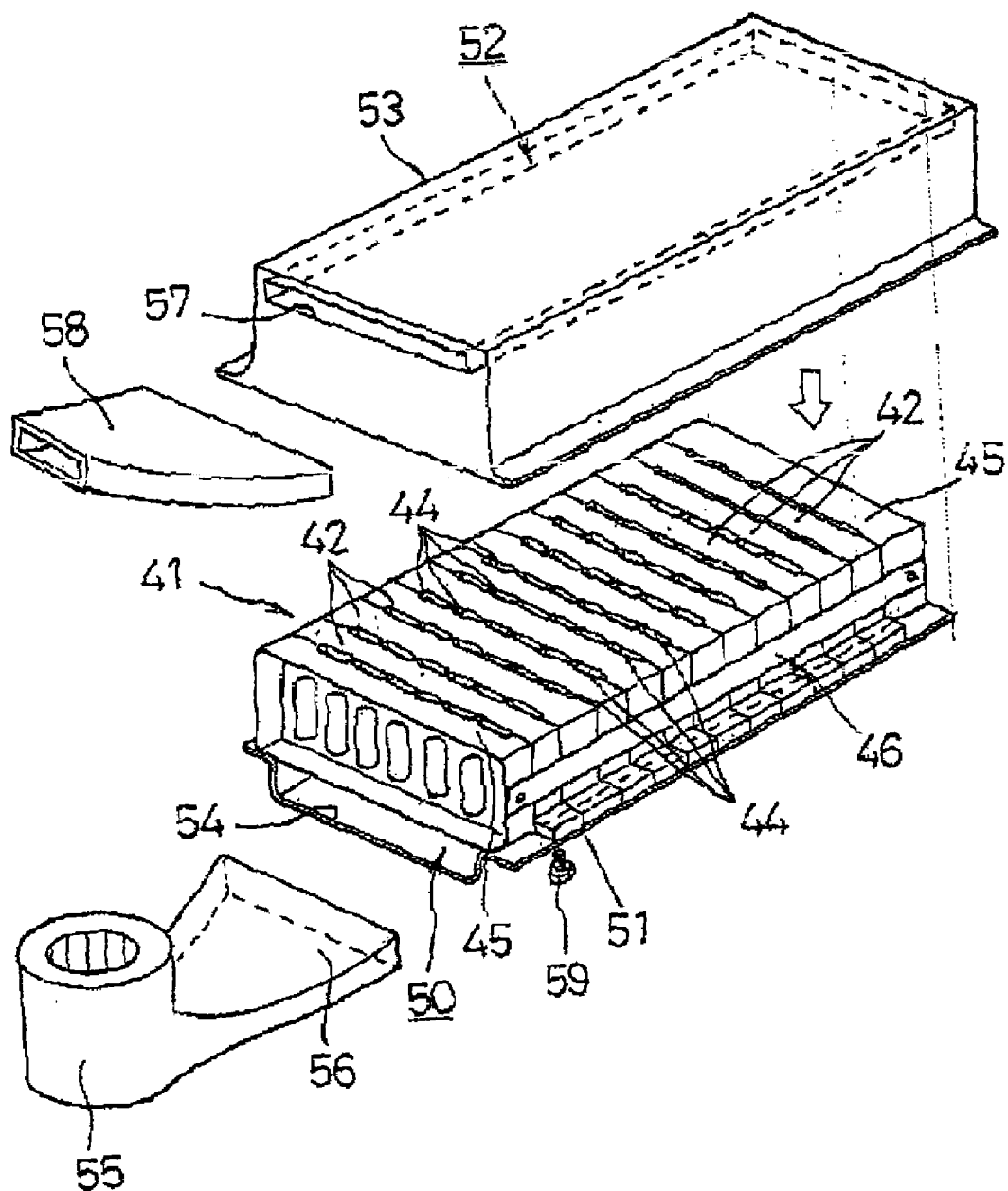
FIG. 7 is an exploded perspective view of a conventional battery pack.
Figure 8:
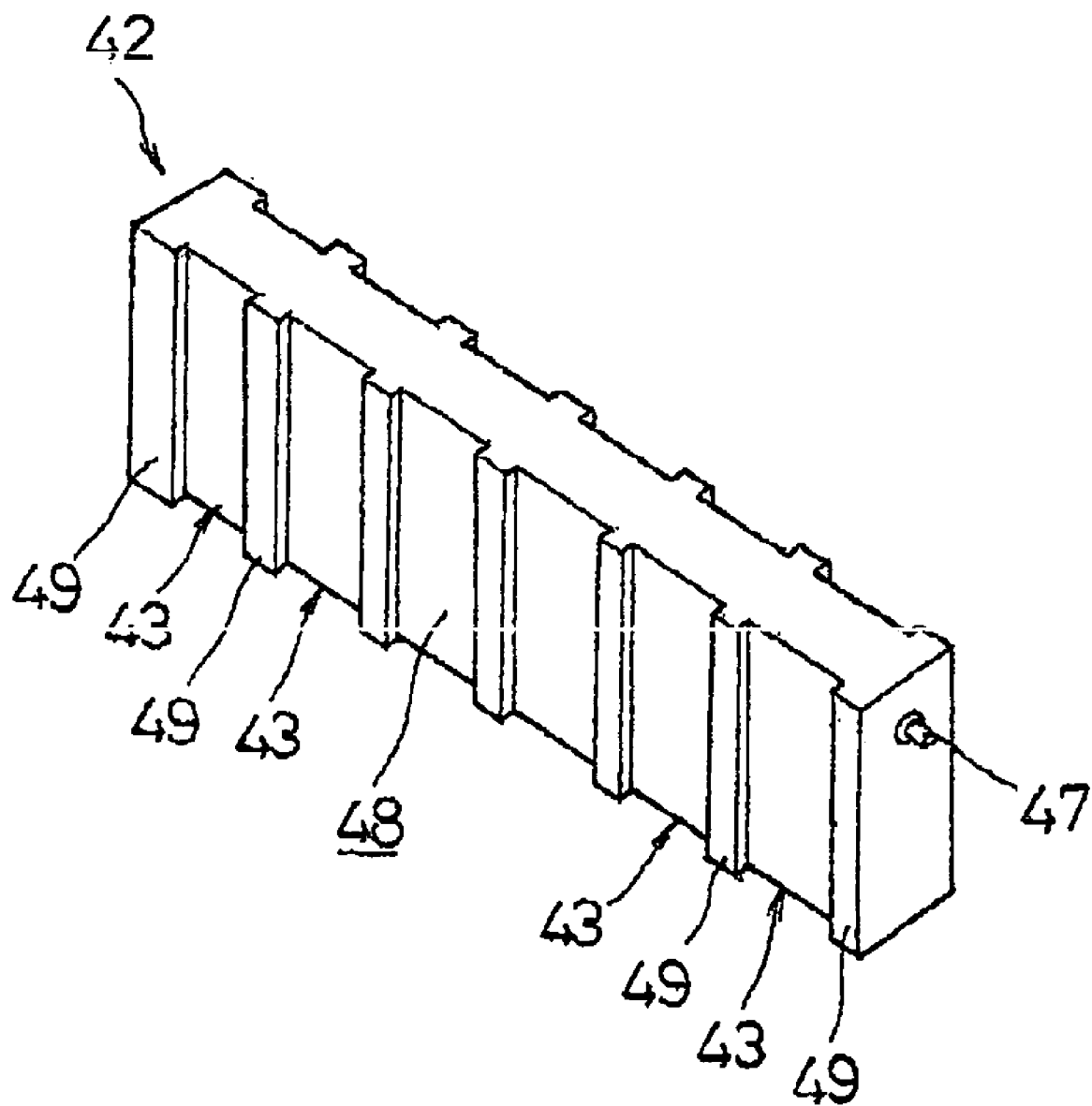
FIG. 8 is a perspective view of a battery module that constitutes the conventional battery pack.

When manufacturing the battery module 2, as shown in virtual lines in FIGS. 4 to 6, the connection projections 23a and 23b of the sealing plate 22 are come into contact with the connection projections 34a and 34b of the bottom face 21a of the case 21. Then, a laser beam, an electron beam or the like is applied to the ends of the connection projections 23a, 34a, and 23b, 34b through a gap between the sealing plate 22 and the bottom face 21a, to mechanically and electrically connect the connection projections 23a and 34a, and 23b and 34b in wielding portions 39.

According to the battery module 2 described above, since the sealed rechargeable battery 5 is in the shape of an ellipse or a flat rectangle in cross section, high cooling performance is obtained in the whole cross section of the battery. Since the metal case 21 has high heat transfer rate, and the protrusions 37 formed in the sidewalls of the case 21 increase the surface area of heat transfer, it is possible to efficiently cool the battery, so that the output characteristics and life-time of the battery are improved. It is unnecessary to carry out an anti-gas permeation processing as in the case of a resin case, so that it is possible to manufacture the case in fewer processes at low cost.

Since the positive end face 30 and the negative end face 31 of the electrode plate assembly 26 are connected to the sealing plate 22 and the bottom face 21a of the case 21 at the plurality of welding portions 38, respectively, the connection projections 23a and 23b provided in the sealing plate 22 and the connection projections 34a and 34b provided in the bottom face 21a of the case 21 become external connection terminals. These external connection terminals and the electrode plate assembly 26 are connected in short connection paths and at the plurality of welding portions 38, so that enlarging connection portions and connection areas reduce connection resistance. Moreover, current distribution becomes even in the electrode plate assembly 26, so that active material evenly reacts in the whole electrode plate. Since the internal resistance of the sealed rechargeable battery 5 is reduced, high output characteristics and large-current discharge characteristics are obtained, thereby achieving high power and longer lifetime.

The plurality of protrusions 37, provided in both sidewalls of the case 21, are formed so as to have such a cross section and a pitch that both sidewalls of the case 21 do not create distortion over a predetermined amount under predetermined internal pressure. This prevents the sidewalls of the case 21 from expanding due to increase in the internal pressure of the battery.

According to the battery pack 1 of the above structure, since the sidewalls of the sealed rechargeable battery 5, constituting the battery module 2, are prevented from expanding, it is possible to easily compose the battery pack 1 by holding both ends of the battery modules 2, simply arranged in parallel, with holding brackets 3 and 4 in the direction perpendicular to the parallel direction of the battery modules 2. It is unnecessary to secure each battery module 2 in the parallel direction, so that an end plate is eliminated to decrease the number of assembly processes and the costs of parts, and to save space for disposing the battery pack 1.

The plurality of battery modules 2 are arranged with the cooling spaces 6 provided between them, and the tubular cover 8 surrounds the periphery of the battery modules 2, in order to form the coolant path 10 around the battery modules 2. Supplying the coolant from one end to the other end of the coolant path 10 with the fan 11, the coolant flows through the cooling spaces 6, so that all battery modules 2 are efficiently cooled from both sidewalls thereof. Since the periphery of the battery modules 2 is surrounded only by the tubular cover 8, the size of the battery pack 1 in the vertical direction becomes only a little larger than the height of the battery module 2. Also it is unnecessary to dispose coolant supply means in the upper and lower sides of the battery pack 1, thereby preventing increase in the height of the battery pack 1 including the cooling device. Accordingly, it is easy to secure installation space of the battery pack 1, when, for example, the battery pack 1 is installed as a drive source for a vehicle.

The holding brackets 3 and 4 are provided with the ring-shaped protrusive wall 7 into which the ends of the battery modules 2 are fitted to hold the battery modules 2. The ring-shaped protrusive wall 7 slides in both ends of the tubular cover 8, and the slits 9 are formed in the holding brackets 3 and 4 in such positions corresponding to the cooling spaces 6 between the battery modules 2. The holding brackets 3 and 4 for holding the battery modules 2 form the coolant path 10 for supplying the cooling spaces 6 with the coolant with the tubular cover 8, and the holding bracket 3 also functions as an attachment member of the fan 11. Accordingly, the battery pack 1 is made further compact.

The heat insulation sheet 13 is properly glued on the sidewalls of the sealed rechargeable battery 5 facing the cooling space 6 to even the cooling performance between the intake side and the discharge side of the coolant. Accordingly even when the coolant flows in one direction, it is possible to prevent decrease in the life-time of the whole battery pack 1, caused by decrease in the life-time of some rechargeable batteries 5 due to variation in temperature of the rechargeable batteries 5. Instead of the heat insulation sheets 13 for restricting cooling, members for promoting cooling, which are made of material with high heat transfer coefficient, such as fins may be disposed in such a manner that the sizes of the members become larger in a direction from the intake side to the discharge side of the coolant.

In the above embodiment, the members for restricting cooling or for promoting cooling are properly disposed in the sidewalls of the rechargeable batteries 5, with supplying the coolant in one direction from one end to the other end of the coolant path 10. However, the fan 11 may be structured so that the blow direction thereof is changeable at a predetermined time interval, or in accordance with difference in detected temperature at both ends of the battery module 2.

According to the battery pack of the present invention, a plurality of sealed rechargeable batteries having a metal case are arranged in a row and integrally connected in series to make the battery module. The plurality of battery modules are arranged in parallel, and the holding brackets hold both ends of the battery modules in the direction perpendicular to the parallel direction, so that the end plate is eliminated, thereby reducing the number of the assembly processes, cost for parts, and the installation space.

The tubular cover provided in the periphery of the battery modules forms the coolant path. Supplying the coolant path with the coolant, the coolant flows through the cooling spaces between battery modules, so that all battery modules are efficiently cooled from both sides thereof. Since the size of the battery pack in the vertical direction becomes only a little larger than the height of the battery module, increase in the height of the battery pack, including the cooling device, is prevented.

Although the present invention has been fully described in connection with the preferred embodiment thereof, it is to be noted that various changes and modifications apparent to those skilled in the art are to be understood as included within the scope of the present invention as defined by the appended claims unless they depart therefrom.

What is claimed is:

1. A battery pack comprising:
   a plurality of battery modules arranged in parallel, each of said battery modules comprising a plurality of sealed rechargeable batteries arranged in a row and integrally connected in series, said sealed rechargeable battery having a metal case;
   a pair of holding brackets for holding both ends of said battery modules in a direction perpendicular to the parallel direction of said battery modules;
   said battery modules being disposed with a cooling space provided between said battery modules;
   said battery pack further comprising:
   a tubular cover for surrounding the periphery of said plurality of battery modules so that said cover surrounds the entire periphery of said plurality of battery modules disposed with a cooling space provided therebetween; and
   a coolant supply device for supplying coolant from one end to the other end of said tubular cover;
   wherein said holding brackets are each provided with a ring-shaped protrusive wall into which said ends of said battery modules are fitted, said ring-shaped protrusive walls slide in both ends of said tubular cover, a slit is formed in said holding brackets in such a position as to correspond to said cooling space between the battery modules, and a fan is provided in the outer surface of at least one of said holding brackets.

2. The battery pack according to claim 1, wherein a member for restricting or promoting cooling is disposed in the sidewall of said sealed rechargeable battery facing said cooling space between said battery modules, to even cooling performance between an intake side and an discharge side of said coolant.

3. The battery pack according to claim 1, wherein a blow direction of said fan is changeable.

* * * * *